April 25, 1961 — W. T. STEPHENS — 2,981,200
GEAR PUMP STRUCTURE
Filed Oct. 5, 1956 — 3 Sheets-Sheet 1

INVENTOR
William T. Stephens
BY
Mason, Porter, Diller & Stewart
ATTORNEYS

April 25, 1961 W. T. STEPHENS 2,981,200
GEAR PUMP STRUCTURE
Filed Oct. 5, 1956 3 Sheets-Sheet 2
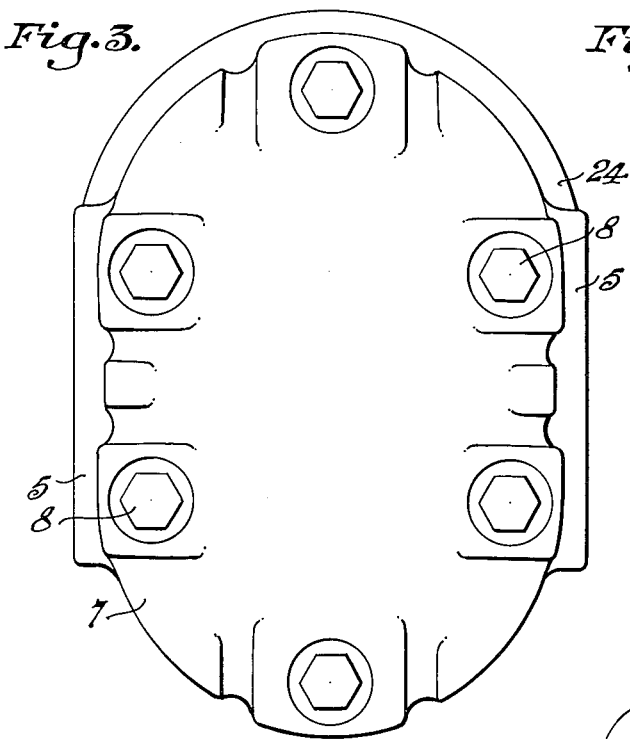
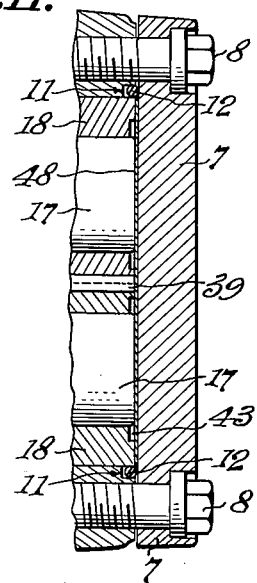
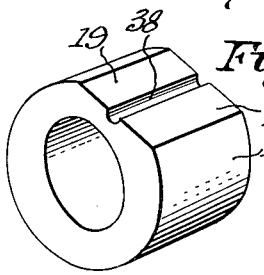
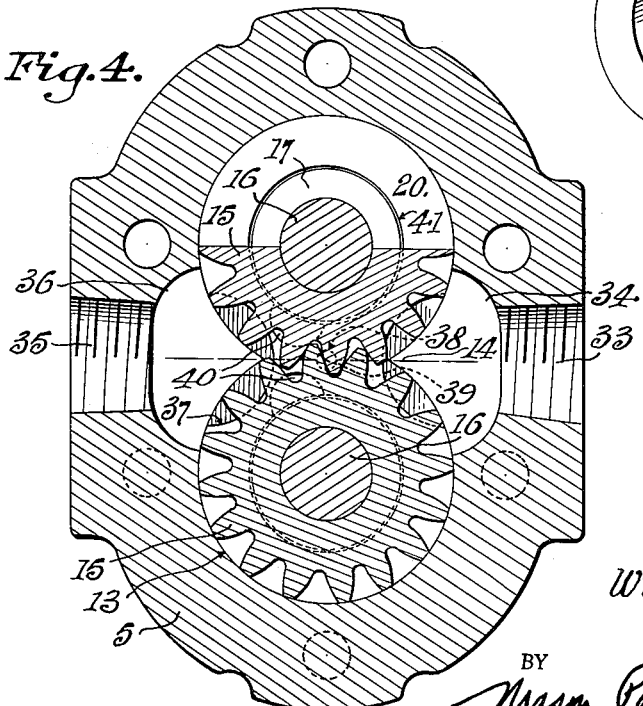
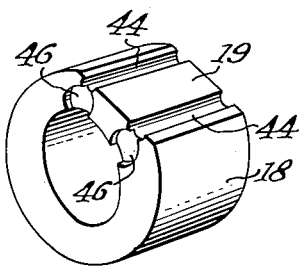
INVENTOR
William T. Stephens
BY
ATTORNEYS April 25, 1961   W. T. STEPHENS   2,981,200
GEAR PUMP STRUCTURE
Filed Oct. 5, 1956   3 Sheets-Sheet 3
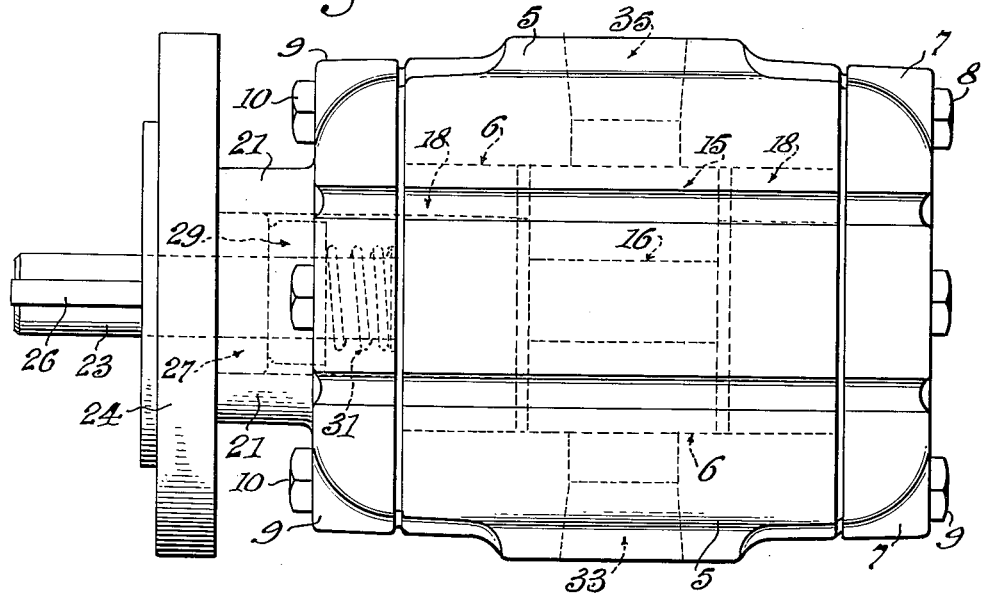
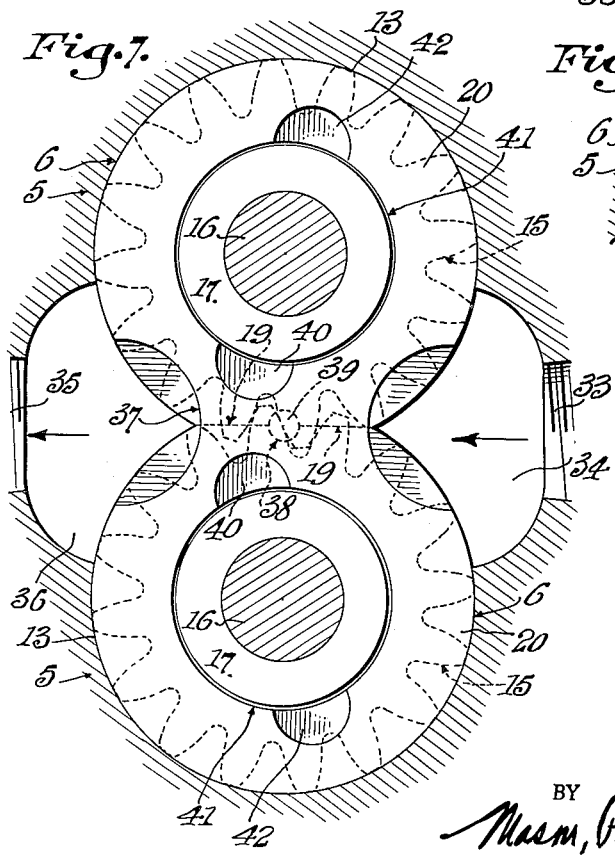
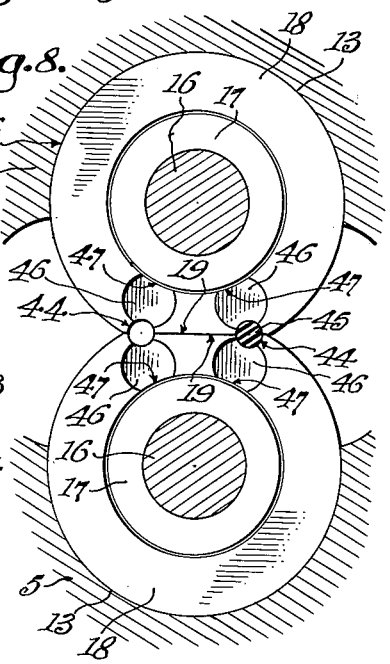
INVENTOR
William T. Stephens United States Patent Office 2,981,200
Patented Apr. 25, 1961

2,981,200

GEAR PUMP STRUCTURE

William T. Stephens, Painesville, Ohio, assignor to The Parker Appliance Company, Cleveland, Ohio, a corporation of Ohio Filed Oct. 5, 1956, Ser. No. 614,312

27 Claims. (Cl. 103—126)

The invention relates generally to rotary pumps and primarily seeks to provide a novel gear pump structure which is simple in form and highly efficient in operation and can be assembled with great facility.

In pumps of the character stated the intermeshing gear or impeller elements each rotate in a generally cylindrical chamber, said chambers intersecting in the region of intermeshing of the gear teeth to form a unitary or composite 8-shaped gear housing chamber. It is a purpose of the present invention to provide a pump structure of the character stated wherein each gear is mounted on a cross shaft supported in two bearing units each mounted on an end portion of the shaft immediately endwise of the respective gear, each bearing unit being supported in a bearing retainer having an in-part cylindrical portion fitting the gear housing chamber and the retainers at each side having opposing flat faces engaging centrally opposite the region of intermeshing of the gear teeth, and there being included sealing means traversing the opposing flat faces of each bearing retainer set and preventing free communication between inlet and outlet sides of the gears by fluid passage between said opposing faces.

An object of the invention is to provide a pump structure of the character stated wherein the gear housing chamber is closed by two end caps secured to the housing, and wherein the gears, the shafts and the retainer sets comprise a unitary sub-assembly readily slidable into and from the housing when one or both of the caps are removed, the sealing means comprising a groove-mounted gasket effective in key fashion to hold the bearing retainers of each set against relative slippage so as to facilitate sliding in or out of the sub-assembly without disturbing the predetermined part relation.

Another object of the invention is to provide a pump structure of the character stated wherein there is a thin 8-shaped wear plate interposed directly between each set of bearing retainers and the adjacent gear ends and traversing and sealing the meeting line of the opposing flat faces thereof, said plates having apertures therein to encircle the bearing units and permit the ends thereof to extend through said apertures into close proximity to said gear ends.

Another object of the invention is to provide in a pump structure of the character stated means for directing pressure fluid from the gear chamber against the outer ends of the bearing retainers to press them against the wear plates and said plates against the gears.

Another object of the invention is to provide a pump structure of the character stated wherein the means for sealing against fluid passage between the opposing flat faces of the bearing retainers comprises registering half cylindrical recessing in said faces and an O-rod gasket mounted in the recessing.

Another object of the invention is to provide a pump structure of the character stated wherein a flat face traversing recessing for an O-rod is formed near each end of the opposing flat faces of a bearing retainer set so that an O-rod can be placed in the recessing to be positioned adjacent the pump inlet and the recessing at the other end or adjacent the outlet can be left open as a pressure fluid communicating passage.

Another object of the invention is to provide in a pump structure of the character stated novel means for preventing shock pressures in gear tooth pockets, and also objectionable cavitation, by directing pressure fluid from tooth pockets at the initial meshing point at the high pressure side over into tooth pockets at the low pressure side.

A further object of the invention is to provide pump structure of the character stated wherein the means for directing the fluid pressure for preventing shock pressures and objectionable cavitation includes recesses formed in the inner faces of the wear plates opposite the passing gear teeth and opening into the bearing unit receiving apertures in said plates.

A still further object of the invention is to provide pump structure of the character stated wherein the outer ends of the bearing retainers are provided with novel recessing forming part of the means for directing pressure fluid against the retainer ends to press them against the retainer plates.

With the above and other objects in view that will hereinafter appear, the nature of the invention will be more clearly understood by reference to the following detailed description, the appended claims and the several views illustrated in the accompanying drawings.

In the drawings:

Figure 3 is a right end elevation.

Figure 4 is a vertical cross section taken on the line 4—4 on Figure 1.

Figure 5 is a plan view.

Figure 7 is an enlarged somewhat diagrammatic face view showing a wear plate as shown in Figure 6 and the relation of the face recessing therein to the meshing gear teeth, the latter being shown in dotted lines.

Figure 8 is an enlarged fragmentary vertical cross sectional view illustrating a modified arrangement in which the opposing flat faces of each set of bearing retainers have two sets of matching cross recessing for selectively receiving a rod gasket whereby the selected recessing will mount the rod and the other recessing will provide a pressure fluid passage.

Figure 9 is a detail perspective view illustrating one of the bearing retainers of Figure 1.

Figure 10 is a detail perspective view illustrating one of the bearing retainers of the modified arrangement shown in Figure 8.

Figure 11 is a fragmentary sectional view illustrating an employment of spacer shim means for taking up wear in the removable sub assembly.

Figure 1:
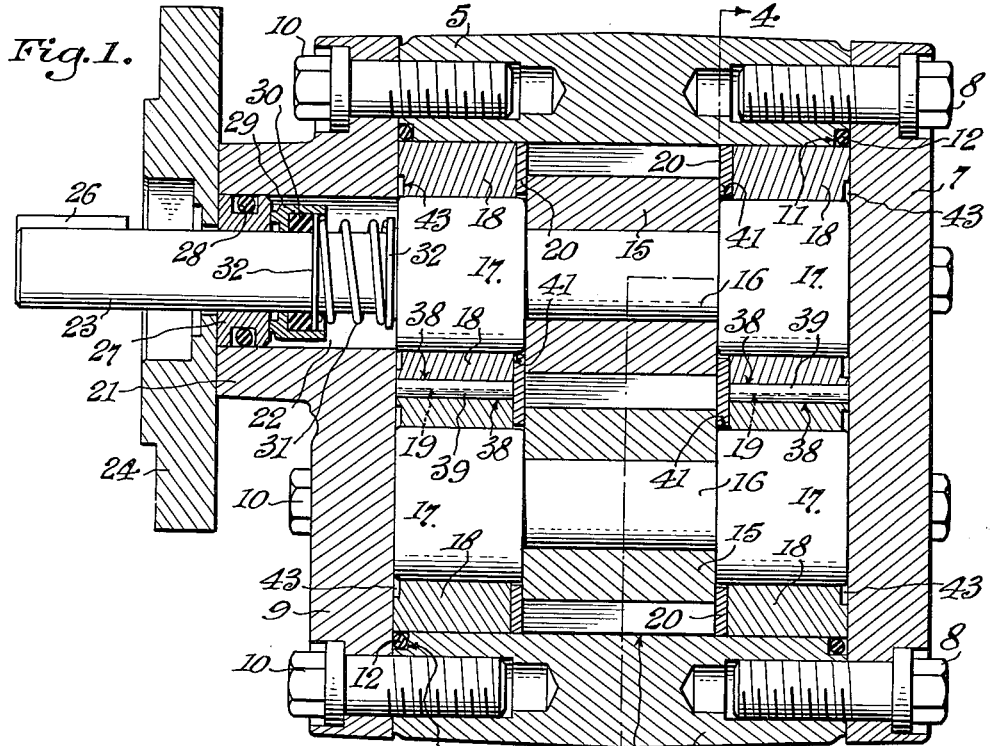
Figure 1 is a central vertical longitudinal section illustrating a preferred form of the improved pump structure.
Figure 2:
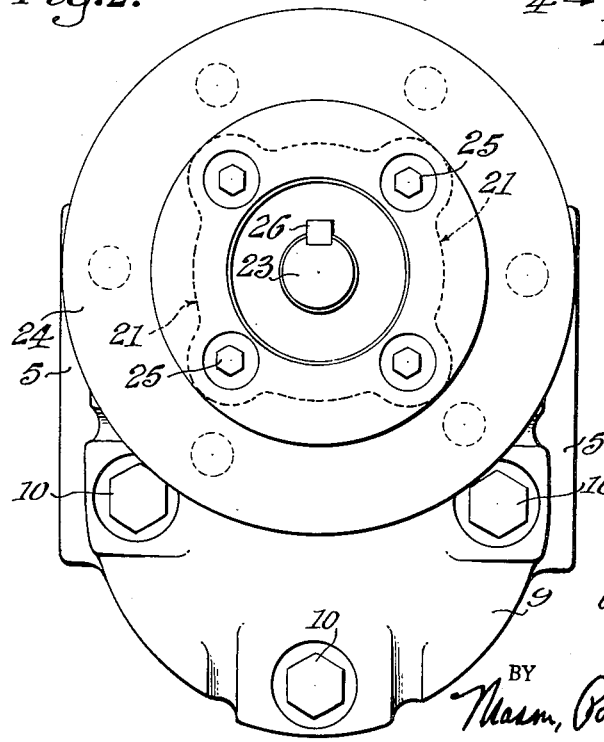
Figure 2 is a left end elevation.

The improved pump structure includes a main housing 5 having an 8-shaped chamber 6 therein opening through the ends of the housing as clearly illustrated in Figure 1. One end of the housing is closed by an end plate 7 removably secured thereover as at 8, and the other end of the housing is enclosed by an end plate 9 removably secured thereon as at 10. At each end the housing is provided with a seat recess 11 surrounding the 8-shaped chamber therein, and on each seat is mounted a sealing means 12 which is engaged by the respective end plate for sealing the respective end of the housing chamber.

Figure 6:
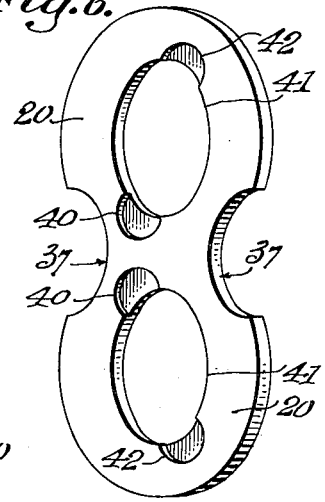
Figure 6 is a detail perspective view looking at the inner face of one of the wear plates, a modified arrangement including cavitation preventing face recessing as well as tooth pocket shock preventing face recessing being shown.

The 8-shaped chamber is composed of two in-part cylindrical portions 13 which intersect at the median line as at 14, and gears or impellers 15 are received in the chamber portions 13 and mesh across said median line in the manner clearly illustrated in Figure 4. Each gear is fixed on a cross shaft 16, and each shaft is rotatably supported in two anti-friction bearing units 17, one such unit being mounted very close to each end of the gear carried by the particular shaft. Each bearing unit 17 is supported in a bearing retainer 18. The retainers of each opposing set are disposed at the right side or at the left side of the gears as viewed in Figure 1 and slidably received in the chamber portions 13 at the particular housing side and have opposing flat faces 19 engaging at the median line across which the gears intermesh in the manner previously stated. An 8-shaped wear plate 20 formed in a single piece as shown in Fig. 6 is disposed between each set of bearing retainers and the respective ends of the meshing gears 15, and each said plate traverses the line of contact of the flat faces 19 of the bearing retainers 18 and provides a seal against direct passage of fluid from the gear tooth pockets onto the opposing flat faces of the bearing retainers. As before stated, one of the wear plates is illustrated in detail in Figure 6 of the drawing.

The housing end plate 9 is provided with a boss extension 21 having an opening 22 therethrough in which to receive a shaft extension 23 which passes through the boss and through an adapter plate 24 secured to the boss as at 25. The adapter plate is readily removable and is interchangeable and is selected according to the mounting upon which the pump is to be supported. The extended shaft end is adapted to be connected at 26 to a suitable drive means (not shown). Within the boss 21 the shaft extension passes through a mating ring 27 which is sealed at 28 at the boss opening. The shaft also passes through a sealing ring 29 within which a seal 30 is pressed by spring means 31 interposed between abutment washers 32.

The housing 5 has an inlet port 33 opening into a centrally disposed inlet chamber enlargement 34 and an outlet port 35 delivering from an outlet or pressure chamber enlargement 36. At the location of the chambers 34 and 36 the wear plates 20 are provided with approximately half circular edge recesses 37. This particular shaping of the wear plate edge recesses is optional and not critical.

In the form of the invention illustrated in Figures 1 through 5, the opposing flat faces 19 of the bearing retainers 18 are equipped with matching half cylindrical cross recesses 38 each to receive an O-rod gasket 39 serving the purpose of preventing free passage of fluid between outlet and inlet ports 35, 33 or high pressure and low pressure chambers 36, 34, and between said bearing retainer flat faces. The O-rod gaskets also serve a very important purpose in acting as key means preventing relative slippage of the opposing flat surfaces of the bearing retainers and preventing any turning askew of the assembly comprising the shafts 16, the gears 15, the bearing units 17 and the bearing retainers 18 when this sub-assembly is removed from or being inserted into the receiving chamber in the housing 5. It will also be apparent that the assembly is such that with the exception of the shaft extension 23 the shafts terminate inwardly of the end plates 7 and 8 and there is no necessity for accurately locating and dimensioning bearing recesses in said end plates.

It will also be noted that in the form of the invention illustrated in Figures 1 through 5, the wear plates 20 are provided at their inner or opposing faces with half circular recesses 40 disposed just beyond a vertical median line through the shaft axes and toward the outlet or high pressure side. These recesses overlap and communicate with the tooth pockets of the gears in the intermeshing area and open into apertures 41 sized to receive the bearing units 17. By thus extending the bearing units 17 through the wear plates 20, it is possible to place the ends thereof in very close proximity to the ends of the gears 15, thus providing very efficient bearings for the impeller shafts.

A modified arrangement is shown in Figures 6 and 7 wherein the opposing faces of the wear plates 20 are also provided with half circular recesses 42 opening into the apertures 41 and disposed to the side of the vertical median line toward the inlet or low pressure side of the housing. In the particular illustration, these recesses are shown as disposed diametrically opposite the previously mentioned recesses 40 but said recesses may be otherwise placed as will be described hereinafter.

The bearing retainers 18 may also be provided with annular recesses 43 in the outer end faces thereof as shown in Figure 1 and the purpose and function of these recesses will be described hereinafter.

Instead of providing the single central cross recessing 38 in the opposing flat faces of the cooperating pairs of bearing retainers 18 as shown in Figures 1 and 4, said flat faces may be provided with such recessing at 44 near each end thereof, or in other words one toward the high pressure or outlet side of the pump, and the other toward the low pressure or inlet side of the pump. These two sets of mating recessing 44 are adapted to selectively receive an O-rod 45, said rod being placed at the low pressure or inlet side. In this arrangement, the recessing 44 devoid of O-rod gasket acts as a cross passage for fluid opening into recesses 46 provided at the outer end faces of the bearing retainers 18 and opening into the bearing unit receiving bores in said retainers as indicated at 47.

The improved pump structures described herein provide marked advantages in the way of simplicity of construction and assembly, and in efficiency of operation. Some of these advantages will be outlined hereinafter.

The particular arrangement of the wear plates 20 is important. These free floating wear plates seal the gear faces and prevent fluid from the gear mesh point from having direct access to the flats 19 between the bearing retainers 18. This makes it unnecessary to go to the expense of lapping the flats, and the free floating arrangement of the plates minimizes problems of warping due to heat and permits each plate to locate itself when expanded due to heat. Moreover, the plates are relatively thin so as to readily flex into position against the gears by the pressure of the bearing retainers for sealing the gear side faces. Wear plates of this general nature are known in the art, but in such arrangements with which I am acquainted such plates are sucked in against the gears at the low pressure or suction side and are forced out or away from the gears at the pressure or outlet side. This was due to the natural pressure differential at the pressure side as compared to the suction side, said pressure differential not being counteracted or counterbalanced. In the arrangement disclosed herein, pressure fluid is so directed endwise against the bearing retainers as to hold them against the wear plates and the wear plates against the gears in a manner for overcoming the difficulties referred to. In the disclosed arrangement, there is controlled pressure of the wear plates against the gears in a manner providing for an efficient seal without danger of seizure. Pressure leakage endwise outwardly through the bearing units 17 is effective against the whole outer areas of the retainers 18 to press them inwardly against the plates 20, and said plates against the outer ends of the gears 15. This pressure is effective through the annular recesses 43 at the outer ends of the bearing retainers 18 when the retainers are constructed as shown in Figure 1, and when the parts are arranged as in the modification illustrated in Figure 8 cross-over pressure is provided through the matching clearances 44 which are devoid of the O-rod and through the outer end recesses 46 in the bearing retainers.

The recesses 40 on the inner faces of the plates 20 near the pressure side serve to direct the pressure in the manner above stated, and when the other plate face recesses 42 are employed (in larger capacity pumps) near the inlet side they serve to direct pressure fluid from the high pressure side to the low pressure side in a manner for counteracting or counterbalancing the inward pressure against the wear plates 20 in the degree desired and according to the spacing of the recesses 42 a greater or lesser distance from the pump inlet. This counterbalancing of pressures assures against seizure. The closer the recesses 42 are placed toward the inlet 33, the greater will be the counterbalancing of the inward pressure directed against the wear plates 20 in the manner previously described. The larger the capacity of the pump, the nearer said recesses 42 will be placed toward the inlet 33.

The particular arrangement of parts herein described also assures efficient lubrication of the parts. The fluid is tapped from the tooth pockets where the teeth are in mesh on the pressure side by means of the recesses 40 on the inner faces of the wear plates 20. The fluid then goes through the plate apertures 41 and outwardly through the bearing units 17 as before stated. From said plate apertures 41, the fluid also passes through the plate recesses 42 where it feeds the tooth pockets passing from the inlet toward the outlet, as before stated, and thus not only aids in lubricating distribution but prevents objectionable cavitation. In addition to preventing objectionable cavitation, the relief of pressure at the initial meshing point of the teeth at the high pressure side of the pump and through the plate recesses 40, the apertures 41 and the plate recesses 42, shock pressure in the tooth pockets at said mesh point is eliminated. This arrangement of recesses and the resulting relieving of pressures in the tooth pockets avoids a forcing of the fluid back to the pump inlet, and in this manner, efficiency of the pump is increased.

By extending the bearing units 17 through the apertures 41 in the wear plates and into very close proximity to the ends of the gear 15 full bearing support is provided right up to the end faces of the gears and the maximum of bearing efficiency is thus insured.

With the gears 15, shafts 16, bearing units 17 and bearing retainers 18 all arranged within the central body housing 5 they can be inserted and removed as a unitary assembly, and a simple shim means 48 can be inserted, as indicated in Figure 11 to compensate for wear in the assembly. The provision of the O-rods, provided either as shown in Figures 1 and 4, or as in Figure 8 intermediately of and parallel the shafts 16 serves to hold the assembly against turning askew in a manner for causing the bearing retainer flats 19 to slide relatively and throw the centers out of line. Thus the O-rods serve not only to seal against fluid passage from high pressure side to low pressure side between the bearing retainers but also as key means holding the parts in line in the manner stated and greatly facilitating insertion of the sub-assembly into and removal thereof from the housing 5.

While example disclosures of the improved structure are made herein it is to be understood that variations in the disclosed structure and part arrangements may be made without departing from the spirit and scope of the invention as defined in the appended claims.

I claim:

1. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units, the two bearing retainers at each end of the 8-shaped chamber comprising a set and contacting at said median line, an 8-shaped wear plate floatably mounted in each end of the 8-shaped chamber between the bearing retainer set and the gear ends at the particular end and traversing and sealing the contacting bearing retainer parts at said median line, said wear plates having apertures therein encircling the bearing units, the length of each bearing unit being substantially equal to the combined length of its associated bearing retainer, and the thickness of its associated wear plate, whereby a maximum support is provided for each bearing retainer and its associated shaft, and said bearing retainer directly abutting said wear plates, said housing having an inlet chamber and an inlet port opening thereinto at the inlet side and a discharge chamber and a port leading out therefrom at the discharge side, and there being included a removably mounted end closure at at least one end of said housing.

2. Pump structure as defined in claim 1, wherein there is an end closure removably mounted at each end of the housing and both ends of one shaft and one end of the other shaft terminate short of projection into any housing end closure portion.

3. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, the bearing retainers of each said set having flat faces where they contact at said median line and matching grooving formed wholly in the contacting flat faces and extending thereacross and housing a seal extending substantially the full lengths of said flat faces, said housing having an inlet chamber and an inlet port opening thereinto at the inlet side, and a discharge chamber and a port leading out therefrom at the discharge side, and there being included a removably mounted end closure at at least one end of said housing.

4. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, the bearing retainers of each said set having flat faces where they contact at said median line and matching half cylindrical grooving extending across the contacting flat faces in the plane in which the shaft axes are located and housing an O-rod seal extending substantially the full lengths of said faces, said housing having an inlet chamber and an inlet port opening thereinto at the inlet side, and a discharge chamber and a port leading out therefrom at the discharge side, and there being included a removably mounted end closure at at least one end of said housing.

5. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, the bearing retainers of each said set having flat faces where they contact at said median line and matching half cylindrical grooving formed wholly in and extending across the contacting flat faces inwardly of but near each end thereof and an O-rod seal in one set only of said grooving, the other set of said grooving forming a fluid passage, said housing having an inlet chamber and an inlet port opening thereinto at the inlet side, and a discharge chamber and a port leading out therefrom at the discharge side, and there being included a removably mounted end closure at at least one end of said housing.

6. In a pump structure of the character described, the subcombination readily mountable in and removable from a housing and comprising, two meshing impeller gears, a shaft carrying each gear, two bearing units surrounding and supporting each shaft one thereof being disposed immediately at each end of the respective gear, a removable bearing retainer supporting each bearing for all except a small portion of the length thereof, each said bearing retainer being in part cylindrical and having a flattened face and the two bearing retainers at each end of the shafts comprising a set and having their flat faces contacting at the meshing zone of the gears, and there being included in the contacting flat faces and spaced inwardly from the ends thereof matching cross grooving housing sealing means also acting as key means preventing relative sliding movement of the contacting faces and turning askew of the shafts.

7. Structure as defined in claim 6 wherein the cross grooving lies in the plane in which the shaft axes lie and provides a cylindrical receiving chamber, and wherein the sealing means comprises an O-rod mounted in said chamber.

8. Pump structure as defined in claim 1 wherein the outer ends of the bearing retainers are provided with annular recesses surrounding the respective bearing units and presenting pressure faces spaced from and opposing the respective housing end caps for receiving pressure fluid to be active against said outer ends to force the bearing retainers against the wear plates and the wear plates against the gears.

9. Pump structure as defined in claim 1 wherein each wear plate has an inner face recess opening into each bearing unit encircling aperture and disposed opposite and opening into the gear tooth pockets as the teeth are coming into mesh at the outlet side of the pump.

10. Pump structure as defined in claim 1 wherein each wear plate has an inner face recess opening into each bearing unit encircling aperture and disposed opposite and opening into the gear tooth pockets as the teeth are coming into mesh at the outlet side of the pump and a similar recess opening similarly into the respective aperture at the inlet side of the pump.

11. In a pump structure of the character described, the subcombination readily mountable in and removable from a housing and comprising, two meshing impeller gears, a shaft carrying each gear, two bearing units surrounding and supporting each shaft one thereof being disposed immediately at each end of the respective gear, a removable bearing retainer supporting each bearing for all except a small portion of the length thereof, each said bearing retainer being in part cylindrical and having a flattened face and the two bearing retainers at each end of the shafts comprising a set and having their flat faces contacting at the meshing zone of the gears, and there also being included in the contacting faces a set of matching cross grooving inwardly of but near each end of said faces and providing a cylindrical chamber, an O-rod seal being mounted in one said cylindrical chamber of each bearing retainer set and the other cylindrical chamber of said set being devoid of sealing means to provide a cross passage for fluid.

12. Structure as defined in claim 11 wherein each bearing retainer has a pressure recess in its outer end face and providing when opposed to a housing portion a pressure fluid receiving chamber communicating with each cross grooving therein and also the opening in which the bearing unit in the particular bearing retainer is received.

13. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, the bearing retainers of each said set having flat faces where they contact at said median line and matching cross grooving inwardly of but near each end of said flat faces and providing a cylindrical chamber, an O-rod seal being mounted in one said cylindrical chamber of each bearing retainer set and the other cylindrical chamber of said set being devoid of sealing means to provide a cross passage for fluid, each bearing retainer also having a pressure recess in its outer end face and placed to be effective when opposed by a housing end cap in providing a pressure fluid receiving chamber communicating with each cross grooving therein, and also the opening in which the bearing unit in the particular bearing retainer is received, said housing having an inlet chamber and an inlet port opening thereinto at the inlet side, and a discharge chamber and a port leading out therefrom at the discharge side, and there being included housing end closure members presenting an end wall portion at each end of said housing and opposing said bearing retainer end face pressure recesses at the particular end of the pump.

14. In a pump structure of the character described, a housing having an 8-shapd chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, an 8-shaped wear plate floatingly mounted in each end of the 8-shaped chamber between the bearing retainer set and the gear ends at the particular end and traversing and sealing the contacting bearing retainer parts at said median line, said wear plates having apertures therein encircling the bearing units, the bearing retainers of each said set having flat faces where they contact at said median line and matching cross grooving inwardly of but near each end of said flat faces and providing a cylindrical chamber, an O-rod seal being mounted in one said cylindrical chamber of each bearing retainer set and the other cylindrical chamber of said set being devoid of sealing means to provide a cross passage for fluid, each bearing retainer also having a pressure recess in its outer end face and placed to be effective when opposed by a housing end cap in providing a pressure fluid receiving chamber communicating with each cross grooving therein and also the opening in which the bearing unit in the particular bearing retainer is received, each said wear plate having an inner face recess opening into each bearing unit encircling aperture and disposed opposite and opening into the gear tooth pockets as the teeth are coming into mesh at the outlet side of the pump, said housing having an inlet chamber and an inlet port opening thereinto at the inlet side, and a discharge chamber and a port leading out therefrom at the discharge side, and there being included housing end closure means presenting an end wall portion at each end of said housing and opposing said bearing retainer end face pressure receses at the particular end of the pump.

15. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units for all except a small portion of the length thereof, the two bearing retainers at each end of the 8-shaped chamber comprising a set and contacting at said median line, an 8-shaped wear plate floatingly mounted in each end of the 8-shaped chamber between the bearing retainer set and the gear ends at the particular end and traversing and sealing the contacting bearing retainer parts at said median line, said wear plates having apertures therein encircling the bearing units, the bearing retainers of each said set having flat faces where they contact at said median line and matching cross grooving inwardly of but near each end of said flat faces and providing a cylindrical chamber, an O-rod being mounted in one said cylindrical chamber of each bearing retainer set and the other cylindrical chamber of said set being devoid of sealing means to provide a cross passage for fluid, each bearing retainer also having a pressure recess in its outer end face and placed to be effective when opposed by a housing end cap in providing a pressure fluid receiving chamber communicating with each cross grooving therein and also the opening in which the bearing unit in the particular bearing retainer is received, each said wear plate having an inner face recess opening into each bearing unit encircling aperture and disposed opposite and opening into the gear tooth pockets as the teeth are coming into mesh at the outlet side of the pump and a similar recess opening into the respective aperture at the inlet side of the pump, said housing having an inlet chamber and an inlet port opening thereinto at the inlet side, and a discharge chamber and a port leading out therefrom at the discharge side, and there being included a housing end closure means presenting at each end of the housing an end wall portion opposing said bearing retainer end face pressure recesses at the particular end of the pump.

16. Pump structure as defined in claim 2 wherein each wear plate has an inner face recess opening into each bearing unit encircling aperture and disposed opposite and opening into the gear tooth pockets as the teeth are coming into mesh at the outlet side of the pump.

17. Pump structure as defined in claim 2 wherein each wear plate has an inner face recess opening into each bearing unit encircling aperture and disposed opposite and opening into the gear tooth pockets as the teeth are coming into mesh at the outlet side of the pump and a similar recess opening into the respective aperture at the inlet side of the pump.

18. Pump structure as defined in claim 1 wherein each wear plate has an inner face recess opening into each bearing unit encircling aperture and disposed opposite and opening into the gear tooth pockets as the teeth are coming into mesh at the outlet side of the pump, and wherein each bearing retainer is provided at its outer end face with an annular recess for receiving pressure fluid to be active against said outer end face to force the bearing retainer against the respective wear plate and the respective wear plate against the adjacent gear end.

19. Pump structure as defined in claim 1 wherein there is an end closure removably mounted at each end of the housing and both ends of one shaft and one end of the other shaft terminate short of projection into any housing end closure portion, and wherein there is included wear compensating shim means mounted between one end closure and the adjacent bearing retainers.

20. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units, the two bearing retainers at each end of the 8-shaped chamber comprising a set and contacting at said median line, an 8-shaped wear plate floatably mounted in each end of the 8-shaped chamber between the bearing retainer set and the gear ends at the particular end and traversing and sealing the contacting bearing retainer parts at said median line, said wear plates having apertures therein encircling the shafts, said housing having an inlet chamber and an inlet port opening thereinto at the inlet side and a discharge chamber and a port leading out therefrom at the discharge side, and there being included a removably mounted end closure at at least one end of said housing, each said wear plate having an inner face recess opening into each shaft encircling aperture and disposed opposite and opening into the gear tooth pockets as the teeth are coming into mesh at the outlet side of the pump.

21. In a pump structure of the character described, a housing having an 8-shaped chamber therein composed of two part-cylindrical chamber portions intersecting at a median line, an impeller gear rotatable in each chamber portion, said gears intermeshing across said median line, a shaft carrying each gear, two bearing units surrounding and supporting each shaft one thereof being disposed immediately at each end of the respective gear, a bearing retainer slidably received in each part-cylindrical chamber portion endwise of a gear and supporting one of the bearing units, the two bearing retainers at each end of the 8-shaped chamber comprising a set and contacting at said median line, and 8-shaped wear plate floatably mounted in each end of the 8-shaped chamber between the bearing retainer set and the gear ends at the particular end and traversing and sealing the contacting bearing retainer parts at said median line, said wear plates having apertures therein encircling the shafts, the length of each bearing unit being substantially equal to the combined length of its associated bearing retainer, and the thickness of its associated wear plate, whereby a maximum support is provided for each bearing retainer and its associated shaft, and said bearing retainer directly abutting said wear plates, said housing having an inlet chamber and an inlet port opening thereinto at the inlet side and a discharge chamber and a port leading out therefrom at the discharge side, and there being included a removably mounted end closure at at least one end of said housing, each said wear plate having an inner face recess opening into each shaft encircling aperture and disposed opposite and opening into the gear tooth pockets as the teeth are coming into mesh at the outlet side of the pump and a similar recess opening similarly into the respective aperture at the inlet side of the pump.

22. For use in a pump structure of the character described, an 8-shaped wear plate formed in a single piece and including two in-part cylindrical edge portions joined along a median line and having a circular aperture concentric with each said edge portion and sized to encircle a bearing unit, and a recess opening into each aperture and placed to be passed over by a part only of each pocket between impeller gear teeth when coming into mesh opposite said median line, said recesses each being of less depth than the thickness of the plate and being spaced from each other and from the outer margin of said plate.

23. For use in a pump structure of the character described, an 8-shaped wear plate formed in a single piece and including two in-part cylindrical edge portions joined along a median line and having a circular aperture concentric with each said edge portion and sized to encircle a bearing unit, and a face recess opening into each aperture and placed to be passed over by a part only of each pocket between impeller gear teeth when coming into mesh opposite said median line and there also being included a face recess opening into each aperture at a position approximately diametrically opposite each of the first mentioned face recesses in the particular aperture encircling portion of the wear plate, said recesses being nonconnecting and each recess being of less depth than the thickness of the plate and spaced from the outer margin of said plate.

24. For use in a pump structure of the character described, an 8-shaped wear plate formed in a single piece and including two in-part cylindrical edge portions joined along a median line and having a circular aperture concentric with each said edge portion and sized to encircle a bearing unit, and a face recess opening into each aperture and placed to be passed over by a part only of each pocket between impeller gear teeth when coming into mesh opposite said median line and there also being included a face recess opening into each aperture at a position approximately diametrically opposite each of the first mentioned face recesses in the particular aperture encircling portion of the wear plate, and placed to be passed over by a part only of each pocket between impeller gear teeth when said teeth are moving with relation thereto in a pump structure, said recesses being nonconnecting and each recess being of less depth than the thickness of the plate and spaced from the outer margin of said plate.

25. A wear plate as defined in claim 22 including in each side edge portion thereof an approximately half circular recess extending through the full thickness of the plate and struck from a center on said median line.

26. A wear plate as defined in claim 23 including in each side edge portion thereof an approximately half circular recess extending through the full thickness of the plate and struck from a center on said median line.

27. A wear plate as defined in claim 22 wherein said recesses are disposed for opening into the aperture at the outlet side of a pump structure so as to receive pressure fluid from gear tooth pockets at said outlet side.

References Cited in the file of this patent

UNITED STATES PATENTS

| | | |
|---|---|---|
| 621,280 | Pitt | Mar. 14, 1899 |
| 2,044,873 | Beust | June 23, 1936 |
| 2,338,065 | Ungar | Dec. 28, 1943 |
| 2,349,022 | Ungar et al. | May 16, 1944 |
| 2,420,622 | Roth et al. | May 13, 1947 |
| 2,487,732 | Schanzlin | Nov. 8, 1949 |
| 2,540,235 | Berkley | Feb. 6, 1951 |
| 2,541,010 | Ungar | Feb. 6, 1951 |
| 2,649,740 | Murray et al. | Aug. 25, 1953 |
| 2,682,836 | Orr | July 6, 1954 |
| 2,707,441 | Drennen | May 3, 1955 |
| 2,714,856 | Kane | Aug. 9, 1955 |
| 2,742,862 | Banker | Apr. 24, 1956 |
| 2,756,681 | Oliver | July 31, 1956 |
| 2,756,684 | Renzo | July 31, 1956 |
| 2,758,548 | Rockwell | Aug. 14, 1956 |
| 2,772,638 | Nagely | Dec. 4, 1956 |
| 2,824,524 | Banker | Feb. 25, 1958 |
| 2,864,315 | Udale | Dec. 16, 1958 |
| 2,865,302 | Murray | Dec. 23, 1958 |
| 2,870,719 | Murray et al. | Jan. 27, 1959 |
| 2,881,704 | Murray | Apr. 14, 1959 |
| 2,884,864 | Bobnar | May 5, 1959 |

FOREIGN PATENTS

| | | |
|---|---|---|
| 1,073,038 | France | Mar. 17, 1954 |

UNITED STATES PATENT OFFICE
CERTIFICATION OF CORRECTION

April 25, 1961

Patent No. 2,981,200

William T. Stephens

It is hereby certified that error appears in the above numbered patent requiring correction and that the said Letters Patent should read as corrected below.

In the grant, lines 2 and 3, for "assignor to The Parker Appliance Company, of Cleveland, Ohio, a corporation of Ohio" read -- assignor to Parker-Hannifin Corporation, a corporation of Ohio, --; line 12, for "The Parker Appliance Company, its successors" read -- Parker-Hannifin Corporation, its successors --; in the heading to the printed specification, lines 3, 4 and 5, for "assignor to The Parker Appliance Company, Cleveland, Ohio, a corporation of Ohio" read -- assignor to Parker-Hannifin Corporation, a corporation of Ohio --.

Signed and sealed this 12th day of September 1961.

(SEAL)
Attest:

ERNEST W. SWIDER

Attesting Officer

DAVID L. LADD

Commissioner of Patents